US012593847B2

(12) United States Patent    (10) Patent No.:   US 12,593,847 B2

Miln et al.    (45) Date of Patent:    Apr. 7, 2026

(54) FORMULATIONS

(71) Applicant: SYNGENTA CROP PROTECTION AG, Basel (CH)

(72) Inventors: Colin Douglas Miln, Greensboro, NC (US); Elizabeth Gray Williard, Greensboro, NC (US)

(73) Assignee: SYNGENTA CROP PROTECTION AG, Basel (CH)

( * ) Notice: Subject to any disclaimer, the term of this patent is extended or adjusted under 35 U.S.C. 154(b) by 453 days.

(21) Appl. No.: 18/040,035

(22) PCT Filed: Jul. 19, 2021

(86) PCT No.: PCT/US2021/042149

§ 371 (c)(1),
(2) Date: Jan. 31, 2023

(87) PCT Pub. No.: WO2022/026229

PCT Pub. Date: Feb. 3, 2022

(65) Prior Publication Data

US 2023/0320361 A1     Oct. 12, 2023

Related U.S. Application Data

(60) Provisional application No. 63/059,283, filed on Jul. 31, 2020.

(51) Int. Cl.

| | |
|---|---|
| *A01N 47/20* | (2006.01) |
| *A01N 25/02* | (2006.01) |
| *A01N 43/56* | (2006.01) |
| *A01N 51/00* | (2006.01) |
| *A01P 3/00* | (2006.01) |

(52) U.S. Cl.
CPC ............. *A01N 47/20* (2013.01); *A01N 25/02* (2013.01); *A01N 43/56* (2013.01); *A01N 51/00* (2013.01); *A01P 3/00* (2021.08)

(58) Field of Classification Search
CPC ........ A01N 25/00; A01N 25/02; A01N 43/56; A01N 47/18; A01N 47/20; A01N 51/00; A01P 3/00; A01P 7/04
See application file for complete search history.

(56) References Cited

U.S. PATENT DOCUMENTS

2005/0070439 A1*   3/2005   Kobori ................. C07D 401/12
                               504/261

FOREIGN PATENT DOCUMENTS

| EP | 2 258 192 A1 | 12/2010 |
|---|---|---|
| WO | 2014095994 A1 | 6/2014 |
| WO | 2017137351 A1 | 8/2017 |
| WO | 2018069109 A1 | 4/2018 |
| WO | 2018177893 A1 | 10/2018 |
| WO | 2018228896 A1 | 12/2018 |

OTHER PUBLICATIONS

Schilder (https://www.canr.msu.edu/news/ effect_of_water_ph_on_ the_stability_of_pesticides, Michigan State University, Mar. 18, 2008) (Year: 2008).*

WIPO; App. No. PCT/US2021/042149; International Search Report and Written Opinion dated Oct. 26, 2021; pp. 1-8.

Extended European Search Report issued in European Patent Application No. EP 21850498.3, mailed Jul. 2, 2024.

Robinson, "Cruiser 350 FS Insecticide Seed Treatment", National Registration Authority for Agricultural and Veterinary Chemicals, Dec. 31, 1998.

Sharma, et al., "Hydrolysis of Chlorantraniliprole and Cyantraniliprole in Various pH Buffer Solutions", Journal of Agricultural and Food Chemistry, vol. 62, No. 16, pp. 3531-3536, Apr. 9, 2014.

* cited by examiner

*Primary Examiner* — Umamaheswari Ramachandran
(74) *Attorney, Agent, or Firm* — BakerHostetler; Toni-Junell Herbert

(57) ABSTRACT

Technology relating to liquid pesticidal formulations, including flowable concentrates for seed treatment, comprising picarbutrazox and the preparation and use of said formulations.

13 Claims, No Drawings

FORMULATIONS

CROSS-REFERENCE TO RELATED APPLICATIONS

This application is a 371 National Stage Application of International Application No. PCT/US2021/042149, filed Jul. 19, 2021, which claims priority to U.S. Provisional Application No. 63/059,283, filed Jul. 31, 2020, the entire contents of which are incorporated by reference herein.

The present invention relates to liquid pesticidal formulations, including flowable concentrates for seed treatment, comprising picarbutrazox, the preparation of said formulations, including in particular, flowable concentrates and a method of using said formulations to combat pests or as plant growth regulators.

Picarbutrazox (1,1-Dimethylethyl N-(6-((((Z)-((1-methyl-1H-tetrazol-5-yl)phenylmethylene)amino) oxy) methyl)-2-pyridinyl)carbamate) is a known compound having fungicidal properties and used in agriculture to control various fungal pathogens. Picarbutrazox is disclosed in U.S. Pat. No. 7,183,299. Picarbutrazox is the active ingredient in the agricultural seed treatment product VAYANTIS, produced by Syngenta Crop Protection, and contains picarbutrazox in a concentration of 36 wt %.

However, it has been found that when picarbutrazox is present in a formulation at low concentrations it can, surprisingly, have chemical stability issues. Additionally, picarbutrazox has chemical stability issues depending on the pH of the formulation, and it has been found that at low pH's (e.g. below ~pH 4) picarbutrazox can degrade. Additionally, when picarbutrazox is present in low concentrations and in combination with other AI's which also have chemical stability issues, the issue of obtaining acceptable chemical stability is further complicated.

Aqueous pesticide concentrates have only a limited storage stability. It is therefore most desirable for practical purposes to provide highly storage-stable pesticide concentrates which may be diluted easily with water, thereby forming stable dilute liquid, such as a suspensions or emulsions, for application purposes. A concentrate which is stable under storage for at least two years is desired.

The present technology now provides for a highly storage-stable aqueous flowable concentrate comprising picarbutrazox alone, or picarbutrazox with one or more additional active ingredients.

In the case where picarbutrazox is present in low concentrations and in combination with other AI's which have chemical stability issues in basic pH (pH>7) the use of pH control (e.g. ~pH 4-7) can be used to successfully deliver a commercially viable product.

A further component of the invention is that when picarbutrazox is present in low concentrations and in combination with AI's which also have chemical stability issues and pH control is used, an optional buffer system can be employed to ensure pH drift is reduced.

It has now been found that aqueous flowable concentrates containing picarbutrazox in low concentrations can be prepared which provide improved storage stability, and in particular, greatly reduces the degradation of picarbutrazox in compositions having a pH of 7 or less. In a further embodiment of the technology, the reduction of picarbutrazox degradation is further facilitated through the addition of a buffering solution to the composition. A buffer as defined herein means a solution that can resist pH change upon the addition of an acidic or basic component. It is able to neutralize small amounts of added acid or base, thus maintaining the pH of the solution relatively stable.

The buffer can be present in the formulation according to the invention in an amount from 0.01 to 6%, preferably 0.1 to 3%, by weight compared to the total weight of all formulation components including Active Ingredients, co-formulants and water. Suitable buffers include those based on phosphate, acetate, carbonate, citrate or borate systems and could include for example potassium dihydrogen phosphate/potassium monohydrogen phosphate, sodium dihydrogen phosphate/sodium monohydrogen phosphate, acetic acid/sodium acetate and citric acid/sodium monohydrogen phosphate. The ratio of the two components present in these buffer systems can vary for example from 20:1 to 1:20 in order to obtain the desired pH. Mixtures of these buffers are also suitable as are buffer systems containing three or more components.

The concentration of picarbutrazox in the composition of the current technology is preferably from 0.01 to 10 wt %.

In one embodiment, the technology provides for a composition comprising:

picarbutrazox at a concentration from 0.01 to 10 wt %, wherein the pH of the composition is from 4 to 7.

In another embodiment, the technology provides for a composition comprising:

picarbutrazox at a concentration from 0.01 to 10 wt %; and a solution of a pH buffer, wherein the pH of the composition is from 4 to 7.

In another embodiment, the technology provides for a composition comprising:

picarbutrazox at a concentration from 0.01 to 10 wt %;

a second active ingredient; and optionally a solution of a pH buffer, wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 30 days at a pH of 9 at 25° C.; wherein the pH of the composition is from 4 to 7.

In another embodiment, the technology provides for a composition comprising:

picarbutrazox at a concentration from 0.01 to 10 wt %;

a second active ingredient wherein the second active ingredient exhibits degradation in water of at least 50% in less than 30 days at a pH of 9 at 25° C.; and optionally a solution of a pH buffer, wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 20 days at a pH of 9 at 25° C.; wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 16 days at a pH of 9 at 25° C.; wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 11 days at a pH of 9 at 25° C.; wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 5 days at a pH of 9 at 25° C.; wherein the pH of the composition is from 4 to 7.

In another embodiment, the technology provides for a composition comprising:

picarbutrazox at a concentration from 0.01 to 10 wt %; and a second active ingredient wherein the second active ingredient exhibits degradation in water of at least 50% in less than 2 days at a pH of 9 at 25° C.; wherein the pH of the composition is from 4 to 7.

Preferably the second active ingredient is present in a ratio from 5:1 to 50:1, second active ingredient to picarbutrazox.

EXAMPLES

Example 1

A standard formulation containing the follow active ingredients was created:

| Active Ingredient | Concentration (% w/w) |
|---|---|
| picarbutrazox | 0.815 |
| Thiamethoxam | 16.3 |
| Fludioxonil | 0.815 |
| Mefenoxam | 2.45 |
| Sedaxane | 0.815 |

The standard formulation contained customary formulation components and resulted in a pH of approximately 5.9. The pH was then adjusted for 9 samples below using $H_3PO_4$ or NaOH. The samples were then stored for two weeks at 54° C. The decomposition of picarbutrazox and thiamethoxam at the end of the two weeks are shown in the table below. The pH range of 4.84 to 6.7 provided a surprising range of acceptable chemical stability for both picarbutrazox and thiamethoxam.

| Sample # | pH (t = 0) | 2 Weeks @ 54° C. picarbutrazox Loss | 2 Weeks @ 54° C. Thiamethoxam Loss |
|---|---|---|---|
| 1 | 3.04 | 94% | 0% |
| 2 | 3.53 | 89% | 0% |
| 3 | 4.84 | 16% | 2% |
| 4 | 5.57 | 14% | 4% |
| 5 | 6.09 | 16% | 1% |
| 6 | 6.70 | 6% | 2% |
| 7 | 8.38 | 12% | 7% |
| 9 | 9.93 | 10% | 12% |

Example 2

Another standard formulation containing the follow active ingredients was created as follows:

| Active Ingredient | Concentration at t = 0 (% w/w) |
|---|---|
| picarbutrazox | 0.365 |
| Fludioxonil | 0.955 |
| Thiamethoxam | 19.5 |
| Mefenoxam | 5.78 |
| Sedaxane | 0.974 |

The standard formulation contained customary formulation components and resulted in a pH of 6.05. The formulation was stored for one year at 20-25° C. The decomposition of all the active ingredients at the end of the one year are shown in the table below. The pH of 6.05 providing excellent chemical stability for picarbutrazox as well at the other active ingredients.

| Active Ingredient | Concentration at t = 0 (% w/w) | Concentration at t = 1 year and 20-25 ° C. (% w/w) | % loss |
|---|---|---|---|
| picarbutrazox | 0.365 | 0.367 | 0 |
| Fludioxonil | 0.955 | 0.944 | 1 |
| Thiamethoxam | 19.5 | 19.1 | 2 |
| Mefenoxam | 5.78 | 5.77 | 0 |
| Sedaxane | 0.974 | 0.970 | 0 |

Example 3

Effect of % w/w picarbutrazox on chemical stability. Four formulations with various picarbutrazox concentrations were stored for two weeks at 54° C. The decomposition of picarbutrazox at the end of the two weeks are shown in the table below. The percentage of picarbutrazox decomposition in the formulations with low concentration of picarbutrazox are shown to be unexpectedly high in view of the high concentration formulations.

| pH | picarbutrazox | % w/w picarbutrazox | picarbutrazox Degradation (2 weeks at 54° C.) |
|---|---|---|---|
| 7.2 | Formulation 1 | 45% | ~1% |
| 7.0 | Formulation 2 | 36% | ~1% |
| 5.9 | Formulation 3 | 1.33% | ~14% |
| 5.76 | Formulation 4 | 0.41% | ~14% |

Example 4

Three standard formulations containing the follow active ingredients were created.

| Active Ingredient | Target Concentration (% w/w) |
|---|---|
| picarbutrazox | 0.42 |
| Fludioxonil | 1.04 |
| Thiamethoxam | 20.8 |
| Mefenoxam | 3.13 |
| Sedaxane | 1.04 |

The standard formulation contained customary formulation components and resulted in a pH's of 5.76, 5.91, and 5.8 as shown in the table below. Each formulation was stored for 19 months at 20-25° C. The decomposition of picarbutrazox was sampled on four occasions during the 19 month period. The formulations providing excellent chemical stability for picarbutrazox indicating no degradation for the entirety of the storage period.

| | | picarbutrazox Concentration (% w/w) | | | |
|---|---|---|---|---|---|
| | pH (t = 0) | Sample 1 (t = 0) | Sample 2 (t = 3 months) | Sample 3 (t = 13 months) | Sample 4 (t = 19 months) |
| Formulation 1 | 5.76 | 0.40 | 0.41 | 0.40 | 0.42 |
| Formulation 2 | 5.91 | 0.40 | 0.41 | 0.41 | 0.43 |
| Formulation 3 | 5.8 | 0.39 | 0.40 | 0.39 | 0.41 |

Example 5

Addition of Buffer Reduces pH Drift

Two standard formulations, one with a buffer and one without, containing the follow active ingredients were created.

| Active Ingredient | Target Concentration (% w/w) |
|---|---|
| picarbutrazox | 0.42 |
| Fludioxonil | 1.04 |
| Thiamethoxam | 20.8 |
| Mefenoxam | 3.13 |
| Sedaxane | 1.04 |

The standard formulation contained customary formulation components and resulted in very similar starting pH, but the buffered system displayed a lower pH drift on storage. The buffer system used was 0.4% w/w of potassium dihydrogen phosphate/potassium monohydrogen phosphate.

| Buffer present? | Initial pH | pH after 1 month storage at 50° C. | pH change (1 month/50° C.) | pH after 3 month storage at 38° C. | pH change (3 months/38° C.) |
|---|---|---|---|---|---|
| No | 7.90 | 7.14 | −0.76 | 7.00 | −0.90 |
| Yes | 7.93 | 7.72 | −0.21 | 7.59 | −0.34 |

Example 6

Addition of Buffer Reduces pH Drift

Two standard formulations, one with a buffer and one without, containing the follow active ingredients were created.

| Active Ingredient | Target Concentration (% w/w) |
|---|---|
| Picarbutrazox | 0.42 |
| Fludioxonil | 1.04 |
| Thiamethoxam | 20.8 |
| Mefenoxam | 3.13 |
| Sedaxane | 1.04 |

The standard formulation contained customary formulation components and resulted in very similar starting pH but the buffered system displayed a lower pH drift on storage. The buffer system used was 1.1% w/w of potassium dihydrogen phosphate/potassium monohydrogen phosphate.

| Buffer present? | Initial pH | pH after 1 month storage at 50° C. | pH change (1 month/50° C.) |
|---|---|---|---|
| No | 6.65 | 6.35 | −0.30 |
| Yes | 6.70 | 6.75 | +0.05 |

Example 7

Picarbutrazox and Second AI Behave Differently Relative to pH

Two standard formulations containing the follow active ingredients were created.

| Active Ingredient | Target Concentration (% w/w) |
|---|---|
| Picarbutrazox | 0.42 |
| Fludioxonil | 1.04 |
| Thiamethoxam | 20.8 |
| Mefenoxam | 6.26 |
| Sedaxane | 1.04 |

The standard formulations contained customary formulation components and were then pH adjusted via the addition of either Sodium Hydroxide (NaOH) or Phosphoric Acid ($H_3PO_4$) to obtain a range of pH's.

| Initial pH | Change in picarbutrazox concentration after storage at 54° C. for 2 weeks | Change in thiamethoxam concentration after storage at 54° C. for 2 weeks |
|---|---|---|
| 8.0 | −6% | −3% |
| 7.2 | −10% | −1% |

Example 8

Picarbutrazox and Second AI Behave Differently Relative to pH

Four standard formulations containing the follow active ingredients were created.

| Active Ingredient | Target Concentration (% w/w) |
|---|---|
| Picarbutrazox | 0.42 |
| Fludioxonil | 1.04 |
| Thiamethoxam | 20.8 |
| Mefenoxam | 3.13 |
| Sedaxane | 1.04 |

The standard formulations contained customary formulation components and were then pH adjusted via the addition of either Sodium Hydroxide (NaOH) or Phosphoric Acid ($H_3PO_4$) to obtain a range of pH's.

| Initial pH | Change in picarbutrazox concentration after storage for 1 month at 50° C. | Change in thiamethoxam concentration after storage for 1 month at 50° C. |
|---|---|---|
| 8.0 | −5% | −7% |
| 7.2 | −13% | −5% |
| 6.0 | −16% | −1% |
| 5.7 | −16% | −1% |

Example 9

High Concentrations of picarbutrazox do not demonstrate significant Al loss

A standard formulation was prepared which contained picarbutrazox as the only Al at 43.3% w/w concentration. The initial pH was pH 7.2. This formulation was then stored under a variety of conditions demonstrating little to no Al loss:

| Initial pH | Change in picarbutrazox concentration after storage for 2 weeks at 54° C. | Change in picarbutrazox concentration after storage for 1 month at 50° C. |
|---|---|---|
| 7.2 | −2% | −1% |

In Examples 8 and 9 above where the picarbutrazox concentration was less than 1% w/w the change in picarbutrazox concentration after storage at 54 C. for 2 weeks was −10% and after storage at 50 C. for 1 month was −13% compared to the values shown in this Example of −2% picarbutrazox change and −1% picarbutrazox change respectively.

Example 10

High concentrations of picarbutrazox (PCBX) do not demonstrate significant Al loss.

A standard formulation was prepared which contained picarbutrazox at 36% w/w concentration. This was then mixed in differing ratios with a standard formulation which contained picarbutrazox at 0.8% w/w concentration. The mixtures were stored for 2 weeks at 54 C. No PCBX loss was observed at high PCBX concentrations as was observed at low PCBX concentrations.

| % w/w of formulation with 36% w/w PCBX | % w/w of formulation with 0.8% w/w PCBX | Theoretical % w/w PCBX in the combined mixture | Actual Measured % w/w PCBX in the combined mixture | Change in PCBX concentration after storage for 2 weeks at 54 C. |
|---|---|---|---|---|
| 90% | 10% | 32.48% | 32.6% | 0% |
| 60% | 40% | 21.92% | 21.8% | 0% |
| 30% | 70% | 11.36% | 11.4% | 0% |
| 0% | 100% | 0.8% | 0.85% | 11% |

Non limiting formulation types include an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP), a soluble granule (SG), a flowable concentrate for seed treatment (FS) or any technically feasible formulation in combination with agriculturally acceptable adjuvants.

The compounds according to the invention can be used as pesticidal agents in unmodified form, but they are generally formulated into compositions in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, micro-emulsifiable concentrates, oil-in-water emulsions, oil-flow-ables, aqueous dispersions, oily dispersions, suspo-emulsions, capsule suspensions, flowable concentrates for seed treatment, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilizers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, poly-amides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The inventive compositions generally comprise from 1 to 99.9% by weight of a formulation adjuvant which preferably includes from 0 to 25% by weight of a surface-active substance. Whereas commercial products may preferably be formulated as concentrates, the end user will normally employ dilute formulations.

The inventive compositions may also include additional pesticides. In particular, the composition may include additional insecticides, nematicides, and/or fungicides.

Insecticides which are preferred mixing partners include Abamectin, Acequinocyl, Acetamiprid, Acetoprole, Acrinathrin, Acynonapyr, Afidopyropen, Afoxalaner, Alanycarb, Allethrin, Alpha-Cypermethrin, Alphamethrin, Amidoflumet, Aminocarb, Azocyclotin, Bensultap, Benzoximate, Benzpyrimoxan, Betacyfluthrin, Beta-cypermethrin, Bifenazate, Bifenthrin, Binapacryl, Bioallethrin, Bioallethrin S)-cyclopentylisomer, Bioresmethrin, Bistrifluron, Broflanilide, Brofluthrinate, Bromophos-ethyl, Buprofezine, Butocarboxim, Cadusafos, Carbaryl, Carbosulfan, Cartap, CAS number: 1472050-04-6, CAS number: 1632218-00-8, CAS number: 1808115-49-2, CAS number: 2032403-97-5, CAS number: 2044701-44-0, CAS number: 2128706-05-6, CAS number: 2249718-27-0, Chlorantraniliprole, Chlordane, Chlorfenapyr, Chloroprallethrin, Chromafenozide, Clenpirin, Cloethocarb, Clothianidin, 2-chlorophenyl N-methylcarbamate (CPMC), Cyanofenphos, Cyantraniliprole, Cyclaniliprole, Cycloprothrin, Cycloxaprid, Cycloxaprid, Cyenopyrafen, Cyetpyrafen (or Etpyrafen), Cyflumetofen, Cyfluthrin, Cyhalodiamide, Cyhalothrin, Cypermethrin, Cyphenothrin, Cyromazine, Deltamethrin, Diafenthiuron, Dialifos, Dibrom, Dicloromezotiaz, Diflovidazine, Diflubenzuron, dimpropyridaz, Dinactin, Dinocap, Dinotefuran, Dioxabenzofos, Emamectin, Empenthrin, Epsilon-momfluorothrin, Epsilon-metofluthrin, Esfenvalerate, Ethion, Ethiprole, Etofenprox, Etoxazole, Famphur, Fenazaquin, Fenfluthrin, Fenitrothion, Fenobucarb, Fenothiocarb, Fenoxycarb, Fenpropathrin, Fenpyroxymate, Fensulfothion, Fenthion, Fentinacetate, Fenvalerate, Fipronil, Flometoquin, Flonicamid, Fluacrypyrim, Fluazaindolizine, Fluazuron, Flubendiamide, Flubenzimine, Flucitrinate, Flucycloxuron, Flucythrinate, Fluensulfone, Flufenerim, Flufenprox, Flufiprole, Fluhexafon, Flumethrin, Fluopyram, Flupyradifurone, Flupyrimin, Fluralaner, Fluvalinate, Fluxametamide, Fosthiazate, Gamma-Cyhalothrin, Gossyplure™, Guadipyr, Halofenozide, Halofenozide, Halofenprox, Heptafluthrin, Hexythiazox, Hydramethylnon, Imicyafos, Imidacloprid, Imiprothrin, Indoxacarb, Iodomethane, Iprodione, Isocycloseram, Isothioate, Ivermectin, Kappa-bifenthrin, Kappa-tefluthrin, Lambda-Cyhalothrin, Lepimectin, Lufenuron, Metaflumizone, Metaldehyde, Metam, Methomyl, Methoxyfenozide, Metofluthrin, Metolcarb, Mexacarbate, Milbemectin, Momfluorothrin, Niclosamide, Nitenpyram, Nithiazine, Omethoate, Oxamyl, Oxazosufyl, Parathion-ethyl, Permethrin, Phenothrin, Phosphocarb, Piperonylbutoxide, Pirimicarb, Pirimiphos-ethyl, Polyhedrosis virus, Prallethrin, Profenofos, Profenofos, Profluthrin, Propargite, Propetamphos, Propoxur, Prothiophos, Protrifenbute, Pyflubumide, Pymetrozine, Pyraclofos, Pyrafluprole, Pyridaben, Pyridalyl, Pyrifluquinazon, Pyrimidifen, Pyrimostrobin, Pyriprole, Pyriproxyfen, Resmethrin, Sarolaner, Selamectin, Silafluofen, Spinetoram, Spinosad, Spirodiclofen, Spiromesifen, Spiropidion, Spirotetramat, Sulfoxaflor, Tebufenozide, Tebufenpyrad, Tebupirimiphos, Tefluthrin, Temephos, Tetrachloraniliprole, Tetradiphon, Tetramethrin, Tetramethylfluthrin, Tetranactin, Tetraniliprole, Theta-cypermethrin, Thiacloprid, Thiamethoxam, Thiocyclam, Thiodicarb, Thiofanox, Thiometon, Thiosultap, Tioxazafen, Tolfenpyrad, Toxaphene, Tralomethrin, Transfluthrin, Triazamate, Triazophos, Trichlorfon, Trichloronate, Trichlorphon, Triflumezopyrim, Tyclopyrazoflor, Zeta-Cypermethrin, Extract of seaweed and fermentation product derived from melasse, Extract of seaweed and fermentation product derived from melasse comprising urea, amino acids, potassium and molybdenum and EDTA-chelated manganese, Extract of seaweed and fermented plant products, Extract of seaweed and fermented plant products comprising phytohormones, vitamins, EDTA-chelated copper, zinc, and iron, Azadirachtin, *Bacillus aizawai, Bacillus chitinosporus* AQ746 (NRRL Accession No B-21 618), *Bacillus firmus, Bacillus kurstaki, Bacillus mycoides* AQ726 (NRRL Accession No. B-21664), *Bacillus pumilus* (NRRL Accession No B-30087), *Bacillus pumilus* AQ717 (NRRL Accession No. B-21662), *Bacillus* sp. AQ178 (ATCC Accession No. 53522), *Bacillus* sp. AQ175 (ATCC Accession No. 55608), *Bacillus* sp. AQ177 (ATCC Accession No. 55609), *Bacillus subtilis* unspecified, *Bacillus subtilis* AQ153 (ATCC Accession No. 55614), *Bacillus subtilis* AQ30002 (NRRL Accession No. B-50421), *Bacillus subtilis* AQ30004 (NRRL Accession No. B-50455), *Bacillus subtilis* AQ713 (NRRL Accession No. B-21661), *Bacillus subtilis* AQ743 (NRRL Accession No. B-21665), *Bacillus thuringiensis* AQ52 (NRRL Accession No. B-21619), *Bacillus thuringiensis* BD#32 (NRRL Accession No B-21530), *Bacillus thuringiensis* subspec. *kurstaki* BMP 123, *Beauveria bassiana*, D-limonene, Granulovirus, Harpin, *Helicoverpa armigera* Nucleopolyhedrovirus, *Helicoverpa zea* Nucleopolyhedrovirus, *Heliothis virescens* Nucleopolyhedrovirus, *Heliothis punctigera* Nucleopolyhedrovirus, *Metarhizium* spp., *Muscodor albus* 620 (NRRL Accession No. 30547), *Muscodor roseus* A3-5 (NRRL Accession No. 30548), Neem tree based products, *Paecilomyces fumosoroseus, Paecilomyces lilacinus, Pasteuria nishizawae, Pasteuria penetrans, Pasteuria ramosa, Pasteuria thornei, Pasteuria usgae, P-cymene, Plutella xylostella Granulosis* virus, *Plutella xylostella* Nucleopolyhedrovirus, Polyhedrosis virus, *pyrethrum*, QRD 420 (a terpenoid blend), QRD 452 (a terpenoid blend), ORD 460 (a terpenoid blend), *Quillaja saponaria, Rhodococcus globerulus* AQ719 (NRRL Accession No B-21663), *Spodoptera frugiperda* Nucleopolyhedrovirus, *Streptomyces galbus* (NRRL Accession No. 30232), *Streptomyces* sp. (NRRL Accession No. B-30145), Terpenoid blend, and *Verticillium* spp.

Nematicides which are preferred mixing partners include AKD-3088 (compound code), 1,2-dibromo-3-chloropropane (IUPAC/Chemical Abstracts name) (1045), 1,2-dichloropropane (IUPAC/Chemical Abstracts name) (1062), 1,2-dichloropropane with 1,3-dichloropropene (IUPAC name) (1063), 1,3-dichloropropene (233), 3,4-dichlorotetrahydrothiophene 1,1-dioxide (IUPAC/Chemical Abstracts name) (1065), 3-(4-chlorophenyl)-5-methylrhodanine (IUPAC name) (980), 5-methyl-6-thioxo-1,3,5-thiadiazinan-3-ylacetic acid (IUPAC name) (1286), 6-isopentenylaminopurine (alternative name) (210), abamectin (1), acetoprole [CCN], alanycarb (15), aldicarb (16), aldoxycarb (863), AZ 60541 (compound code), benclothiaz [CCN], benomyl (62), butylpyridaben (alternative name), cadusafos (109), carbofuran (118), carbon disulfide (945), carbosulfan (119), chloropicrin (141), chlorpyrifos (145), cloethocarb (999), cytokinins (alternative name) (210), dazomet (216), DBCP (1045), DCIP (218), diamidafos (1044), dichlofenthion (1051), dicliphos (alternative name), dimethoate (262), doramectin (alternative name) [CCN], emamectin (291), emamectin benzoate (291), eprinomectin (alternative name) [CCN], ethoprophos (312), ethylene dibromide (316), fenamiphos (326), fenpyrad (alternative name), fensulfothion (1158), fosthiazate (408), fosthietan (1196), furfural (alternative name) [CCN], GY-81 (development code) (423), heterophos [CCN], iodomethane (IUPAC name) (542), isamidofos (1230), isazofos (1231), ivermectin (alternative name) [CCN], kinetin (alternative name) (210), mecarphon (1258), metam (519), metam-potassium (alternative name) (519), metam-sodium (519), methyl bromide (537), methyl isothiocyanate (543), milbemycin oxime (alternative name) [CCN], moxidectin (alternative name) [CCN], *Myrothecium verrucaria* composition (alternative name) (565), NC-184 (compound code), oxamyl (602), phorate (636), phosphamidon (639), phosphocarb [CCN], sebufos (alternative name), selamectin (alternative name) [CCN], spinosad (737), terbam (alternative name), terbufos (773), tetrachlorothiophene (IUPAC/Chemical Abstracts name) (1422), thiafenox (alternative name), thionazin (1434), triazophos (820), triazuron (alternative name), xylenols [CCN], YI-5302 (compound code) and zeatin (alternative name) (210), fluensulfone [318290-98-1], fluopyram, a nitrification inhibitor selected from the group of substances consisting of potassium ethylxanthate [CCN] and nitrapyrin (580).

Fungicides which are preferred mixing partners include a compound selected from the group of substances consisting of petroleum oils, 1,1-bis(4-chlorophenyl)-2-ethoxyethanol, 2,4-dichlorophenyl benzenesulfonate, 2-fluoro-N-methyl-N-1-naphthylacetamide, 4-chlorophenyl phenyl sulfone, acetoprole, aldoxycarb, amidithion, amidothioate, amiton, amiton hydrogen oxalate, amitraz, aramite, arsenous oxide, azobenzene, azothoate, benomyl, benoxafos, benzyl benzoate, bixafen, brofenvalerate, bromocyclen, bromophos, bromopropylate, buprofezin, butocarboxim, butoxycarboxim, butylpyridaben, calcium polysulfide, camphechlor, carbanolate, carbophenothion, cymiazole, chinomethionat, chlorbenside, chlordimeform, chlordimeform hydrochloride, chlorfenethol, chlorfenson, chlorfensulfide, chlorobenzilate, chloromebuform, chloromethiuron, chloropropylate, chlorthiophos, cinerin I, cinerin II, cinerins, closantel, coumaphos, crotamiton, crotoxyphos, cufraneb, cyanthoate, DCPM, DDT, demephion, demephion-O, demephion-S, demeton-methyl, demeton-O, demeton-O-methyl, demeton- S, demeton-S-methyl, demeton-S-methylsulfon, dichlofluanid, dichlorvos, dicliphos, dienochlor, dimefox, dinex, dinex-diclexine, dinocap-4, dinocap-6, dinocton, dinopenton, dinosulfon, dinoterbon, dioxathion, diphenyl sulfone, disulfiram, DNOC, dofenapyn, doramectin, endothion, eprinomectin, ethoate-methyl, etrimfos, fenazaflor, fenbutatin oxide, fenothiocarb, fenpyrad, fenpyroximate, fenpyrazamine, fenson, fentrifanil, flubenzimine, flucycloxuron, fluenetil, fluorbenside, FMC 1137, formetanate, formetanate hydrochloride, formparanate, gamma-HCH, glyodin, half-enprox, hexadecyl cyclopropanecarboxylate, isocarbophos, jasmolin I, jasmolin II, jodfenphos, lindane, malonoben, mecarbam, mephosfolan, mesulfen, methacrifos, methyl bromide, metolcarb, mexacarbate, milbemycin oxime, mipafox, monocrotophos, morphothion, moxidectin, naled, 4-chloro-2-(2-chloro-2-methyl-propyl)-5-[(6-iodo-3-pyridyl)methoxy]pyridazin-3-one, nifluridide, nikkomycins, nitrilacarb, nitrilacarb 1:1 zinc chloride complex, omethoate, oxydeprofos, oxydisulfoton, pp'-DDT, parathion, permethrin, phenkapton, phosalone, phosfolan, phosphamidon, polychloroterpenes, polynactins, proclonol, promacyl, propoxur, prothidathion, prothoate, pyrethrin I, pyrethrin II, pyrethrins, pyridaphenthion, pyrimitate, quinalphos, quintiofos, R-1492, phosglycin, rotenone, schradan, sebufos, selamectin, sophamide, SSI-121, sulfiram, sulfluramid, sulfotep, sulfur, diflovidazin, tau-fluvalinate, TEPP, terbam, tetradifon, tetrasul, thiafenox, thiocarboxime, thiofanox, thiometon, thioquinox, thuringiensin, triamiphos, triarathene, triazophos, triazuron, trifenofos, trinactin, vamidothion, vaniliprole, bethoxazin, copper dioctanoate, copper sulfate, cybutryne, dichlone, dichlorophen, endothal, fentin, hydrated lime, nabam, quinoclamine, quinonamid, simazine, triphenyltin acetate, triphenyltin hydroxide, crufomate, piperazine, thiophanate, chloralose, fenthion, pyridin-4-amine, strychnine, 1-hydroxy-1H-pyridine-2-thione, 4-(quinoxalin-2-ylamino)benzenesulfonamide, 8-hydroxyquinoline sulfate, bronopol, copper hydroxide, cresol, dipyrithione, dodicin, fenaminosulf, formaldehyde, hydrargaphen, kasugamycin, kasugamycin hydrochloride hydrate, nickel bis(dimethyldithiocarbamate), nitrapyrin, octhilinone, oxolinic acid, oxytetracycline, potassium hydroxyquinoline sulfate, probenazole, streptomycin, streptomycin sesquisulfate, tecloftalam, thiomersal, Adoxophyes orana GV, *Agrobacterium radiobacter, Amblyseius* spp., *Anagrapha falcifera* NPV, Anagrus atomus, *Aphelinus abdominalis, Aphidius colemani, Aphidoletes aphidimyza, Autographa californica* NPV, *Bacillus sphaericus Neide, Beauveria brongniartii, Chrysoperla carnea, Cryptolaemus montrouzieri, Cydia pomonella* GV, *Dacnusa sibirica, Diglyphus isaea, Encarsia formosa, Eretmocerus eremicus, Heterorhabditis bacteriophora* and *H. megidis, Hippodamia convergens, Leptomastix dactylopii, Macrolophus caliginosus, Mamestra brassicae* NPV, *Metaphycus helvolus, Metarhizium anisopliae* var. *acridum, Metarhizium anisopliae* var. *anisopliae, Neodiprion sertifer* NPV and *N. lecontei* NPV, *Orius* spp., *Paecilomyces fumosoroseus, Phytoseiulus persimilis, Steinernema bibionis, Steinernema carpocapsae, Steinernema feltiae, Steinernema glaseri, Steinernema riobrave, Steinernema riobravis, Steinernema scapterisci, Steinernema* spp., *Trichogramma* spp., *Typhlodromus occidentalis, Verticillium lecanii,* apholate, bisazir, busulfan, dimatif, hemel, hempa, metepa, methiotepa, methyl apholate, morzid, penfluron, tepa, thiohempa, thiotepa, tretamine, uredepa, (E)-dec-5-en-1-yl acetate with (E)-dec-5-en-1-ol, (E)-tridec-4-en-1-yl acetate, (E)-6-methylhept-2-en-4-ol, (E,Z)-tetradeca-4,10-dien-1-yl acetate, (Z)-dodec-7-en-1-yl acetate, (Z)-hexadec-11-enal, (Z)-hexadec-11-en-1-yl acetate, (Z)-hexadec-13-en-11-yn-1-yl acetate, (Z)-icos-13-en-10-one, (Z)-tetradec-7-en-1-al, (Z)-tetradec-9-en-1-ol, (Z)-tetradec-9-en-1-yl acetate, (7E,9Z)-dodeca-7,9-dien-1-yl acetate, (9Z,11E)-tetradeca-9,11-dien-1-yl acetate, (9Z, 12E)-tetradeca-9,12-dien-1-ylacetate, 14-methyloctadec-1-ene, 4-methylnonan-5-ol with 4-methylnonan-5-one, alpha-multistriatin, brevicomin, codlelure, codlemone, cuelure, disparlure, dodec-8-en-1-yl acetate, dodec-9-en-1-yl acetate, dodeca-8, 10-dien-1-ylacetate, dominicalure, ethyl 4-methyloctanoate, eugenol, frontalin, grandlure, grandlure I, grandlure II, grandlure Ill, grandlure IV, hexalure, ipsdienol, ipsenol, japonilure, lineatin, litlure, looplure, medlure, megatomoic acid, methyl eugenol, muscalure, octadeca-2, 13-dien-1-yl acetate, octadeca-3,13-dien-1-yl acetate, orfralure, oryctalure, ostramone, siglure, sordidin, sulcatol, tetradec-11-en-1-yl acetate, trimedlure, trimedlure A, trimedlure B1, trimedlure B2, trimedlure C, trunc-call, 2-(octylthio)ethanol, butopyronoxyl, butoxy(polypropylene glycol), dibutyl adipate, dibutyl phthalate, dibutyl succinate, diethyltoluamide, dimethyl carbate, dimethyl phthalate, ethyl hexanediol, hexamide, methoquin-butyl, methylneodecanamide, oxamate, picaridin, 1-dichloro-1-nitroethane, 1,1-dichloro-2,2-bis(4-ethylphenyl)ethane, 1,2-dichloropropane with 1,3-dichloropropene, 1-bromo-2-chloroethane, 2,2,2-trichloro-1-(3,4-dichlorophenyl)ethyl acetate, 2,2-dichlorovinyl 2-ethylsulfinylethyl methyl phosphate, 2-(1,3-dithiolan-2-yl)phenyl dimethylcarbamate, 2-(2-butoxyethoxy)ethyl thiocyanate, 2-(4,5-dimethyl-1,3-dioxolan-2-yl)phenyl methylcarbamate, 2-(4-chloro-3,5-xylyloxy) ethanol, 2-chlorovinyl diethyl phosphate, 2-imidazolidone, 2-isovalerylindan-1,3-dione, 2-methyl(prop-2-ynyl)aminophenyl methylcarbamate, 2-thiocyanatoethyl laurate, 3-bromo-1-chloroprop-1-ene, 3-methyl-1-phenylpyrazol-5-yl dimethylcarbamate, 4-methyl(prop-2-ynyl)amino-3,5-xylylmethylcarbamate, 5,5-dimethyl-3-oxocyclohex-1-enyl dimethylcarbamate, acethion, acrylonitrile, aldrin, allosamidin, allyxycarb, alpha-ecdysone, aluminium phosphide, aminocarb, anabasine, athidathion, azamethiphos, *Bacillus thuringiensis* delta endotoxins, barium hexafluorosilicate, barium polysulfide, barthrin, Bayer 22/190, Bayer 22408, beta-cyfluthrin, beta-cypermethrin, bioethanomethrin, biopermethrin, bis(2-chloroethyl) ether, borax, bromfenvinfos, bromo-DDT, bufencarb, butacarb, butathiofos, butonate, calcium arsenate, calcium cyanide, carbon disulfide, carbon tetrachloride, cartap hydrochloride, cevadine, chlorbicyclen, chlordane, chlordecone, chloroform, chloropicrin, chlorphoxim, chlorprazophos, cis-resmethrin, cismethrin, clocythrin, copper acetoarsenite, copper arsenate, copper oleate, coumithoate, cryolite, CS 708, cyanofenphos, cyanophos, cyclethrin, cythioate, d-tetramethrin, DAEP, dazomet, decarbofuran, diamidafos, dicapthon, dichlofenthion, dicresyl, dicyclanil, dieldrin, diethyl 5-methylpyrazol-3-yl phosphate, dilor, dimefluthrin, dimetan, dimethrin, dimethylvinphos, dimetilan, dinoprop, dinosam, dinoseb, diofenolan, dioxabenzofos, dithicrofos, DSP, ecdysterone, EI 1642, EMPC, EPBP, etaphos, ethiofencarb, ethyl formate, ethylene dibromide, ethylene dichloride, ethylene oxide, EXD, fenchlorphos, fenethacarb, fenitrothion, fenoxacrim, fenpirithrin, fensulfothion, fenthion-ethyl, flucofuron, fosmethilan, fospirate, fosthietan, furathiocarb, furethrin, guazatine, guazatine acetates, sodium tetrathiocarbonate, halfenprox, HCH, HEOD, heptachlor, heterophos, HHDN, hydrogen cyanide, hyquincarb, IPSP, isazofos, isobenzan, isodrin, isofenphos, isolane, isoprothiolane, isoxathion, juvenile hormone I, juvenile hormone II, juvenile hormone III, kelevan, kinoprene, lead arsenate, leptophos, lirimfos, lythidathion, m-cumenyl methylcarbamate, magnesium phosphide, mazidox, mecarphon, menazon, mercurous chloride, mesulfenfos, metam, metam-potassium, metam-sodium, methanesulfonyl fluoride, methocrotophos, methoprene, methothrin, methoxychlor, methyl isothiocyanate, methylchloroform, methylene chloride, metoxadiazone, mirex, naftalofos, naphthalene, NC-170, nicotine, nicotine sulfate, nithiazine, nornicotine, O-5-dichloro-4-iodophenyl O-ethyl ethylphosphonothioate, O,O-diethyl O-4-methyl-2-oxo-2H-chromen-7-yl phosphorothioate, O,O-diethyl O-6-methyl-2-propylpyrimidin-4-yl phosphorothioate, O,O,O', O'-tetrapropyl dithiopyrophosphate, oleic acid, para-dichlorobenzene, parathion-methyl, pentachlorophenol, pentachlorophenyl laurate, PH 60-38, phenkapton, phosnichlor, phosphine, phoxim-methyl, pirimetaphos, polychlorodicyclopentadiene isomers, potassium arsenite, potassium thiocyanate, precocene I, precocene II, precocene III, primidophos, profluthrin, promecarb, prothiofos, pyrazophos, pyresmethrin, quassia, quinalphos-methyl, quinothion, rafoxanide, resmethrin, rotenone, kadethrin, ryania, ryanodine, sabadilla), schradan, sebufos, SI-0009, thiapronil, sodium arsenite, sodium cyanide, sodium fluoride, sodium hexafluorosilicate, sodium pentachlorophenoxide, sodium selenate, sodium thiocyanate, sulcofuron, sulcofuron-sodium, sulfuryl fluoride, sulprofos, tar oils, tazimcarb, TDE, tebupirimfos, temephos, terallethrin, tetrachloroethane, thicrofos, thiocyclam, thiocyclam hydrogen oxalate, thionazin, thiosultap, thiosultap-sodium, tralomethrin, transpermethrin, triazamate, trichlormetaphos-3, trichloronat, trimethacarb, tolprocarb, triclopyricarb, triprene, veratridine, veratrine, XMC, zetamethrin, zinc phosphide, zolaprofos, and meperfluthrin, tetramethylfluthrin, bis (tributyltin) oxide, bromoacetamide, ferric phosphate, niclosamide-olamine, tributyltin oxide, pyrimorph, trifenmorph, 1,2-dibromo-3-chloropropane, 1,3-dichloropropene, 3,4-dichlorotetrahydrothiophene 1,1-dioxide, 3-(4-chloro-phenyl)-5-methylrhodanine, 5-methyl-6-thioxo-1,3,5-thiadiazinan-3-ylacetic acid, 6-isopentenylaminopurine, benclothiaz, cytokinins, DCIP, furfural, isamidofos, kinetin, *Myrothecium verrucaria* composition, tetrachlorothiophene, xylenols, zeatin, potassium ethylxanthate, acibenzolar, acibenzolar-S-methyl, Reynoutria sachalinensis extract, alpha-chlorohydrin, antu, barium carbonate, bisthiosemi, brodifacoum, bromadiolone, bromethalin, chlorophacinone, cholecalciferol, coumachlor, coumafuryl, coumatetralyl, crimidine, difenacoum, difethialone, diphacinone, ergocalciferol, flocoumafen, fluoroacetamide, flupropadine, flupropadine hydrochloride, norbormide, phosacetim, phosphorus, pindone, pyrinuron, scilliroside, sodium fluoroacetate, thallium sulfate, warfarin, 2-(2-butoxyethoxy)ethyl piperonylate, 5-(1,3-benzodioxo1-5-yl)-3-hexylcyclohex-2-enone, farnesol with nerolidol, verbutin, MGK 264, piperonyl butoxide, piprotal, propyl isomer, S421, sesamex, sesasmolin, sulfoxide, anthraquinone, copper naphthenate, copper oxychloride, dicyclopentadiene, thiram, zinc naphthenate, ziram, imanin, ribavirin, mercuric oxide, thiophanate-methyl, azaconazole, bitertanol, bromuconazole, cyproconazole, difenoconazole, diniconazole, epoxiconazole, fenbuconazole, fluquinconazole, flusilazole, flutriafol, furametpyr, hexaconazole, imazalil, imibenconazole, ipconazole, metconazole, myclobutanil, paclobutrazole, pefurazoate, penconazole, prothioconazole, pyrifenox, prochloraz, propiconazole, pyrisoxazole, simeconazole, tebuconazole, tetraconazole, triadimefon, triadimenol, triflumizole, triticonazole, ancymidol, fenarimol, nuarimol, bupirimate, dimethirimol, ethirimol, dodemorph, fenpropidine, fenpropimorph, spiroxamine, tridemorph, cyprodinil, mepanipyrim, pyrimethanil, fenpiclonil, fludioxonil, benalaxyl, furalaxyl, metalaxyl, Rmetalaxyl, ofurace, oxadixyl, carbendazim, debacarb, fuberidazole, thiabendazole, chlozolinate, dichlozoline, myclozoline, procymidone, vinclozoline, boscalid, carboxin, fenfuram, flutolanil, mepronil, oxycarboxin, penthiopyrad, thifluzamide, dodine, iminoctadine, azoxystrobin, dimoxystrobin, enestroburin, fenaminstrobin, flufenoxystrobin, fluoxastrobin, kresoxim-methyl, metominostrobin, trifloxystrobin, orysastrobin, picoxystrobin, pyraclostrobin, pyrametostrobin, pyraoxystrobin, ferbam, mancozeb, maneb, metiram, propineb, zineb, captafol, captan, fluoroimide, folpet, tolylfluanid, bordeaux mixture, copper oxide, mancopper, oxine-copper, nitrothal-isopropyl, edifenphos, iprobenphos, phosdiphen, tolclofos-methyl, anilazine, benthiavalicarb, blasticidin-S, chloroneb, chlorothalonil, cyflufenamid, cymoxanil, diclocymet, diclomezine, dicloran, diethofencarb, dimethomorph, flumorph, dithianon, ethaboxam, etridiazole, famoxadone, fenamidone, fenoxanil, ferimzone, fluazinam, fluopicolide, flusulfamide, fluxapyroxad, fenhexamid, fosetyl-aluminium, hymexazol, iprovalicarb, cyazofamid, methasulfocarb, metrafenone, pencycuron, phthalide, polyoxins, propamocarb, pyribencarb, proquinazid, pyroquilon, pyriofenone, quinoxyfen, quintozene, tiadinil, triazoxide, tricyclazole, triforine, validamycin, valifenalate, zoxamide, mandipropamid, isopyrazam, sedaxane, benzovindiflupyr, pydiflumetofen, 3-difluoromethyl-1-methyl-1H-pyrazole-4-carboxylic acid (3',4',5'-trifluoro-biphenyl-2-yl)-amide, isoflucypram, isotianil, dipymetitrone, 6-ethyl-5,7-dioxo-pyrrolo[4,5][1,4]dithiino [1,2-c]isothiazole-3-carbonitrile, 2-(difluoromethyl)-N-[3-ethyl-1,1-dimethyl-indan-4-yl]pyridine-3-carboxamide, 4-(2,6-difluorophenyl)-6-methyl-5-phenyl-pyridazine-3-carbonitrile, (R)-3-(difluoromethyl)-1-methyl-N-[1,1,3-trimethylindan-4-yl]pyrazole-4-carboxamide, 4-(2-bromo-4-fluoro-phenyl)-N-(2-chloro-6-fluoro-phenyl)-2,5-dimethyl-pyrazol-3-amine, 4-(2-bromo-4-fluorophenyl)-N-(2-chloro-6-fluorophenyl)-1,3-dimethyl-1H-pyrazol-5-amine, fluindapyr, coumethoxystrobin (jiaxiangjunzhi), Ivbenmixianan, dichlobentiazox, mandestrobin, 3-(4,4-difluoro-3,4-dihydro-3,3-dimethylisoquinolin-1-yl)quinolone, 2-[2-fluoro-6-[(8-fluoro-2-methyl-3-quinolyl)oxy]phenyl] propan-2-ol, oxathiapiprolin, tert-butyl N-[6-[[[(1-methyl-tetrazol-5-yl)-phenyl-methylene]amino]oxymethyl]-2-pyridyl]carbamate, pyraziflumid, inpyrfluxam, trolprocarb, mefentrifluconazole, ipfentrifluconazole, 2-(difluoromethyl)-N-[(3R)-3-ethyl-1,1-dimethyl-indan-4-yl]pyridine-3-carboxamide, N'-(2,5-dimethyl-4-phenoxy-phenyl)-N-ethyl-N-methyl-formamidine, N'-[4-(4,5-dichlorothiazol-2-yl)oxy-2,5-dimethyl-phenyl]-N-ethyl-N-methyl-formamidine, [2-[3-[2-[1-[2-[3,5-bis(difluoromethyl) pyrazol-1-yl]acetyl]-4-piperidyl]thiazol-4-yl]-4,5-dihydroisoxazol-5-yl]-3-chloro-phenyl] methanesulfonate, but-3-ynyl N-[6-[[(Z)-[(1-methyltetrazol-5-yl)-phenyl-methylene]amino]oxymethyl]-2-pyridyl]carbamate, methyl N-[[5-[4-(2,4-dimethylphenyl)triazol-2-yl]-2-methyl-phenyl]methyl]carbamate, 3-chloro-6-methyl-5-phenyl-4-(2,4,6-trifluorophenyl)pyridazine, pyridachlometyl, 3-(difluoromethyl)-1-methyl-N-[1,1,3-trimethylindan-4-yl]pyrazole-4-carboxamide, 1-[2-[[1-(4-chlorophenyl)pyrazol-3-yl] oxymethyl]-3-methyl-phenyl]-4-methyl-tetrazol-5-one, 1-methyl-4-[3-methyl-2-[[2-methyl-4-(3,4,5-trimethylpyrazol-1-yl)phenoxy]methyl]phenyl]tetrazol-5-one, aminopyrifen, ametoctradin, amisulbrom, penflufen, (Z,2E)-5-[1-(4-chlorophenyl)pyrazol-3-yl]oxy-2-methoxyimino-N,3-dimethyl-pent-3-enamide, florylpicoxamid, fenpicoxamid, tebufloquin, ipflufenoquin, quinofumelin, isofetamid, N-[2-[2,4-dichloro-phenoxy]phenyl]-3-(difluoromethyl)-1-methyl-pyrazole-4-carboxamide, N-[2-[2-chloro-4-(trifluoromethyl)phenoxy]phenyl]-3-(difluoromethyl)-1-methyl-pyrazole-4-carboxamide, benzothiostrobin, phenamacril, 5-amino-1,3,4-thiadiazole-2-thiol zinc salt (2:1), fluopyram, flutianil, fluopimomide, pyrapropoyne, picarbutrazox, 2-(difluoromethyl)-N-(3-ethyl-1,1-dimethyl-indan-4-yl)pyridine-3-carboxamide, 2-(difluoromethyl)-N-((3R)-1,1,3-trimethylindan-4-yl)pyridine-3-carboxamide, 4-[[6-[2-(2,4-difluorophenyl)-1,1-difluoro-2-hydroxy-3-(1,2,4-triazol-1-yl)propyl]-3-pyridyl]oxy]benzonitrile, metyltetraprole, 2-(difluoromethyl)-N-((3R)-1,1,3-trimethylindan-4-yl)pyrdine-3-carboxamdie, α-(1,1-dimethylethyl)-α-[4'-(trifluoromethoxy)[1,1'-biphenyl]-4-yl]-5-pyrimidinemethanol, fluoxapiprolin, enoxastrobin, 4-[[6-[2-(2,4-difluorophenyl)-1,1-difluoro-2-hydroxy-3-(1,2,4-triazol-1-yl)propyl]-3-pyridyl]oxy] benzonitrile, 4-[[6-[2-(2,4-difluorophenyl)-1,1-difluoro-2-hydroxy-3-(5-sulfanyl-1,2,4-triazol-1-yl) propyl]-3-pyridyl]oxy] benzonitrile, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile, trinexapac, coumoxystrobin, zhongshengmycin, thiodiazole copper, zinc thiazole, amectotractin, iprodione.

Additional preferred fungicides may include N-methoxy-N-[[4-[5-(trifluoromethyl)-1,2,4-oxadiazol-3-yl]phenyl] methyl]cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, N-[[4-[5-(trifluoromethyl)-1,2,4-oxadiazol-3-yl]phenyl]methyl]propanamide, 4,4-dimethyl-2-[[4-[5-(trifluoromethyl)-1,2,4-oxadiazol-3-yl] phenyl]methyl]isoxazolidin-3-one, 5,5-dimethyl-2-[[4-[5-(trifluoromethyl)-1,2,4-oxadiazol-3-yl]phenyl]methyl] isoxazolidin-3-one, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine. The compounds in this paragraph may be prepared from the methods described in WO 2017/055473, WO 2017/055469, WO 2017/093348 and WO 2017/118689;

2-[6-(4-chlorophenoxy)-2-(trifluoromethyl)-3-pyridyl]-1-(1,2,4-triazol-1-yl)propan-2-ol (this compound may be prepared from the methods described in WO 2017/029179);

2-[6-(4-bromophenoxy)-2-(trifluoromethyl)-3-pyridyl]-1-(1,2,4-triazol-1-yl)propan-2-ol (this compound may be prepared from the methods described in WO 2017/029179);

3-[2-(1-chlorocyclopropyl)-3-(2-fluorophenyl)-2-hydroxy-propyl]imidazole-4-carbonitrile (this compound may be prepared from the methods described in WO 2016/156290);

3-[2-(1-chlorocyclopropyl)-3-(3-chloro-2-fluoro-phenyl)-2-hydroxy-propyl]imidazole-4-carbonitrile (this compound may be prepared from the methods described in WO 2016/156290);

(4-phenoxyphenyl)methyl2-amino-6-methyl-pyridine-3-carboxylate (this compound may be prepared from the methods described in WO 2014/006945);

2,6-Dimethyl-1H,5H-[1,4]dithiino[2,3-c:5,6-c']dipyrrole-1,3,5,7(2H,6H)-tetrone (this compound may be prepared from the methods described in WO 2011/138281);

N-methyl-4-[5-(trifluoromethyl)-1,2,4-oxadiazol-3-yl]benzenecarbothioamide;

N-methyl-4-[5-(trifluoromethyl)-1,2,4-oxadiazol-3-yl]benzamide;

(Z,2E)-5-[1-(2,4-dichlorophenyl)pyrazol-3-yl]oxy-2-methoxyimino-N,3-dimethyl-pent-3-enamide (this compound may be prepared from the methods described in WO 2018/153707);

N'-(2-chloro-5-methyl-4-phenoxy-phenyl)-N-ethyl-N-methyl-formamidine;

N'-[2-chloro-4-(2-fluorophenoxy)-5-methyl-phenyl]-N-ethyl-N-methyl-formamidine (this compound may be prepared from the methods described in WO 2016/202742); and 2-(difluoromethyl)-N-[(3S)-3-ethyl-1,1-dimethyl-indan-4-yl]pyridine-3-carboxamide (this compound may be prepared from the methods described in WO 2014/095675).

Of particular importance in the present technology are those pesticides which exhibit degradation in water of at least 50% in less than 30 days at a pH of 9 at 25° C. Examples of pesticides which exhibit degradation in water of at least 50% in less than 30 days at a pH of 9 at 25° C. include thiamethoxam, cyantraniliprole, and chlorantraniliprole. Physical chemistry stability can be easily obtained by those of skilled in the art, or such information may be available in The Pesticide Manual, Online Edition, by the British Crop Production Council (BCPC), for example, as shown below:

| Pesticide Name | Physical Chemistry: Stability |
|---|---|
| thiamethoxam | Hydrolysis stable (pH 1, 5, 7) $DT_{50}$ 7.3-15.6 d (pH 9) (25° C.). Aqueous photolysis $DT_{50}$ 2.3-3.1 d. |
| cyantraniliprole | Hydrolysis $DT_{50}$ 261 d (pH 4), 61 d (pH 7), 1.8 d (pH 9) (20° C.). Aqueous photolysis $DT_{50}$ 0.22 d. |
| chlorantraniliprole | Hydrolysis stable (pH 4-7), $DT_{50}$ 10 d pH 9 (25° C.). Aqueous photolysis $DT_{50}$ 0.37 d (pH 7). |

The invention claimed is:

1. A storage stable, aqueous, and concentrate composition, comprising:
   0.01 to 10 wt % of picarbutrazox;
   0.01 to 6 wt % a buffer; and
   a second active ingredient;
   wherein the pH of the composition is from 4 to 7;
   wherein the weight ratio of the second active ingredient to the picarbutrazox is from 5:1 to 50:1; and
   wherein said second active ingredient is thiamethoxam, cyantraniliprole, or chlorantraniliprole.

2. The composition of claim 1, wherein the second active ingredient is thiamethoxam.

3. The composition of claim 1, wherein the second active ingredient is cyantraniliprole.

4. The composition of claim 1, wherein the second active ingredient is chlorantraniliprole.

5. The composition of claim 1, wherein the buffer is selected from phosphate, acetate, carbonate, citrate, and borate systems.

6. The composition of claim 1, further comprising fludioxonil.

7. The composition of claim 1, further comprising mefenoxam.

8. The composition of claim 1, further comprising sedaxane.

9. The composition of claim 1, further comprising fludioxonil, mefenoxam, and sedaxane.

10. The composition of claim 1, wherein composition exhibits little to no loss of picarbutrazox when stored at 54° C. for 2 weeks.

11. The composition of claim 1, wherein composition exhibits little to no decomposition of picarbutrazox when stored at 20-25° C. for one year.

12. The composition of claim 1, wherein composition exhibits little to no decomposition of picarbutrazox when stored at 20-25° C. for 19 months.

13. A method of protecting a seed, comprising:

diluting the composition of claim 1; and treating a seed with the diluted composition.

* * * * *